3,433,027
HYDROGEN PURIFICATION WITH CONDENSATE WASH AND HYDROGEN ADDITION TO CONDENSATE

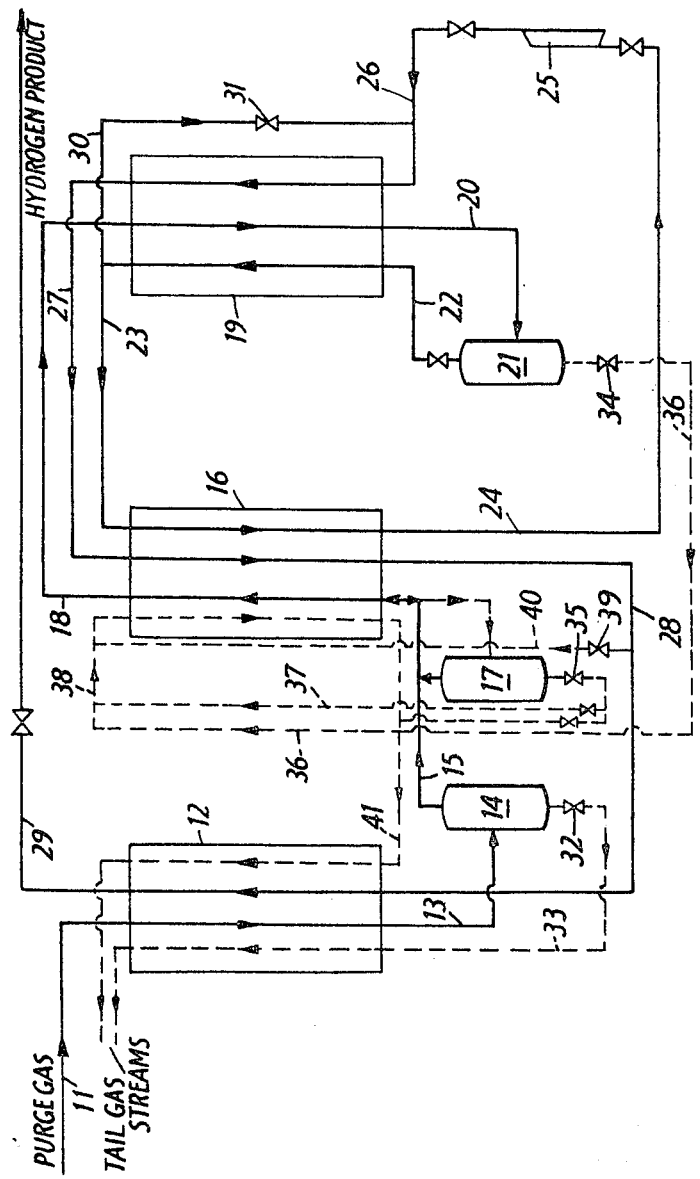

Paul L. Charlesworth, Huddersfield, and Alan A. Haslam, Stockport, England, assignors to Petrocarbon Developments Limited
Filed Oct. 9, 1967, Ser. No. 673,891
Claims priority, application Great Britain, Oct. 17, 1966, 46,397/66
U.S. Cl. 62—23                                   4 Claims
Int. Cl. F25t 1/02, 1/00

---

ABSTRACT OF THE DISCLOSURE

Hydrogen rich gas is passed upwardly through a next to the last heat exchange zone wherein it is contacted by descending condensate formed therein to remove substantially all the argon and methane present as well as part of the nitrogen. The concentrated hydrogen is then passed downwardly through a final heat exchange zone to condense remaining nitrogen therefrom. Resulting purified hydrogen is heated in the final heat exchange zone and then in the next to the last heat exchange zone after which it is work expanded and again passes through the final and next to the last heat exchange zones. A portion of the purified hydrogen is then added to combined expanded condensate streams and the thus combined stream passes downwardly through the initial heat exchange zone to cool and condense impurities from the hydrogen rich feed gas.

---

Summary of the invention

This invention relates to the recovery of a hydrogen concentrate from a gaseous mixture containing hydrogen as its main component by volume and containing nitrogen and argon and possibly also a hydrocarbon gas, such as methane. More especially the invention is concerned with the recovery of a hydrogen concentrate from ammonia synthesis purge gas.

It is known that in the synthesis of ammonia from nitrogen and hydrogen, inert impurities such as argon and methane present in the feed gas tend to accumulate in the synthesis reactor thereby having a detrimental effect on the reaction. To avoid this accumulation it is necessary to remove continuously these impurities in a purge gas stream which contains in addition to the argon and methane high concentrations of hydrogen and nitrogen. This invention provides a process of recovering the hydrogen at low cost in a concentrated form suitable for returning to the ammonia synthesis plant or for use in any other way.

In pending application Ser. No. 511,695 filed Dec. 6, 1965 by Paul Lane Charlesworth, now Patent No. 3,363,428, there is set forth a process for the recovery of a hydrogen concentrate from ammonia synthesis purge gas, which comprises:

(a) Cooling the gaseous mixture at the elevated pressure by passing it through at least two heat exchangers with the condensation of components other than hydrogen taking place in at least the final two heat exchangers, the partially concentrated hydrogen from the last but one heat exchanger being passed upwardly through the final heat exchanger with condensate formed therein flowing downwards in contact with the rising stream (b) Separating the condensed liquid fraction after each heat exchanger in which condensation takes place (c) Passing the hydrogen concentrate leaving the top of the final heat exchanger downwardly through the final heat exchanger in indirect heat exchange with the partially concentrated hydrogen passing upwardly therethrough (d) Expanding at least one part of the hydrogen concentrate leaving the lower end of the final heat exchanger with the performance of external work to produce refrigeration for use in the process (e) Returning the expanded hydrogen concentrate through all the heat exchangers countercurrent to and in indirect heat exchange with the incoming gaseous mixture (f) Returning the residual hydrogen concentrate, if any, through all the heat exchangers other than the final heat exchanger countercurrent to and in indirect heat exchange with the incoming gaseous mixture (g) Expanding the liquified condensate from each heat exchanger and returning each expanded liquid condensate through the heat exchanger in which it was formed and through the preceding heat exchangers in countercurrent to and in indirect heat exchange with the incoming gaseous mixture, the condensates being evaporated and warmed up in their passage through the heat exchangers.

In the process set forth in said patent specification, the final purification step takes place in the heat exchanger through which the gas to be purified passes upwardly with condensed impurities flowing downwardly as reflux in contact with the upwardly flowing gas, and three streams are passed downwardly in indirect heat exchange with the upwardly flowing gas stream, the said three streams being (a) the hydrogen concentrate obtained from the upwardly flowing gas and leaving the top of the heat exchanger; (b) at least part of the hydrogen concentrate referred to in (a) after it has passed downwardly through the heat exchanger a first time and has been expanded with the performance of external work to produce cold in known fashion; and (c) condensate condensed out of the upwardly flowing gas and collected at the lower end of the heat exchanger, said condensate being first expanded to a lower pressure and then being evaporated in its passage downwardly through the heat exchanger. The three downwardly flowing streams serve to cool the feed gas to the required temperature to condense the impurities compatible with this temperature and to create the correct temperature profile along the exchanger. It is of particular importance that the evaporating liquid stream passes through the heat exchanger from top to bottom since the temperature of this stream rises as evaporation proceeds.

By operating in this manner it is ensured that the argon and methane content of the gas is reduced to a minimum without freezing of any of these components in the system. However, in order to obtain a hydrogen concentrate of high purity, in excess of 90%, e.g. 98%, it is necessary to operate the final cooling stage at such a low temperature that sufficient nitrogen is condensed for this purpose and this renders it necessary to reduce the evaporation temperature of the condensate stream flowing downwardly through the final heat exchanger by introducing a portion of the hydrogen concentrate product (after expansion to the same pressure) thereinto. This method of operation is described in the earlier patent specification mentioned above. As will be obvious, this reduce sthe yield of hydrogen product for concentrates of high purity.

It is an object of the present invention to minimise this loss in yield whilst still obtaining a product of high purity.

It has now been found that it is possible to operate the final heat exchanger of the process set forth above at a higher temperature than is required to obtain the desired degree of purity whilst still substantially completely removing argon and methane and to obtain the desired degree of purity by removing additional nitrogen in a further, following heat exchanger operating at a lower temperature without reflux action and without an evaporating condensate cooling stream.

In the said further heat exchanger the concentrated hydrogen stream from the preceding reflux heat exchanger is passed downwardly and after leaving the heat exchanger the finally concentrated hydrogen is separated from the condensed nitrogen and is passed upwardly through the said further heat exchanger as a cooling stream in indirect heat exchange with the downwardly flowing stream. The said cooling stream after leaving the said further heat exchanger is passed downwardly through the preceding reflux heat exchanger as one of the three streams passing downwardly therethrough and thereafter is expanded with the performance of work to produce refrigeration for use in the process, then passed upwardly through said further heat exchanger in indirect heat exchange with the downwardly passing stream and then passed back through the preceding heat exchangers countercurrently to and in indirect heat exchange with the incoming gaseous mixture.

Depending on the refrigeration requirements, only a part of the finally concentrated hydrogen may be passed downwardly through the reflux heat exchanger and be expanded with the performance of external work and the residual, by-passed hydrogen concentrate may, after expansion without performance of external work be recombined with the expanded concentrate to return therewith through the heat exchangers. Any residual by-passed hydrogen concentrate may alternatively be simply returned as a separate stream through the heat exchangers preceding the reflux heat exchanger and collected as a separate stream at a higher pressure than that of the expanded stream.

In this modified form of the process less hydrogen concentrate may be utilised for injection into the condensate stream prior to evaporation of the latter in the reflux heat exchanger and accordingly the yield may be increased by several percent in obtaining a hydrogen concentrate of the same high degree of purity as in the unmodified process.

One embodiment of the invention as applied to the recovery of a hydrogen concentrate from ammonia synthesis purge gas is described below with reference to the accompanying drawing.

The purge gas was of the following composition:

| | Mol Percent |
|---|---|
| Hydrogen | 69.0 |
| Nitrogen | 23.0 |
| Argon | 2.7 |
| Methane | 5.3 |

The purge gas available at 135 kg./cm.² absolute and a temperature of 10° C. is expanded to a pressure of 70 kg./cm.² absolute and then freed from water and final traces of ammonia by passage through a molecular sieve adsorber. Two adsorbers may be used in alternating fashion, one being regenerated whilst the other is in service.

The purge gas from which the final traces of ammonia and water have been removed is expanded through an expansion valve to a pressure of 40 kg./cm.² absolute and is then fed via line 11 to heat exchanger 12. In passing through heat exchanger 12 the purge gas is cooled to 85° K. so that the greater part of the argon and methane and some of the nitrogen condense. The mixture of gas and condensed liquid is passed by line 13 to separator 14, in which the liquid fraction is separated. The residual gas mixture is then passed via line 15 to heat exchanger 16 through which it passes upwardly and in which it is further cooled to 70° K. with the result that the remaining traces of argon and methane and most of the nitrogen condense and descend as reflux in contact with the rising gas. The condensate is collected in separator 17 below the heat exchanger 16 and the hydrogen concentrate is passed via line 18 to a further heat exchanger 19 in passing through which it is cooled to 66° K. to condense additional nitrogen. The mixture of liquid and gas leaving heat exchanger 19 is passed by line 20 to separator 21. The purified hydrogen gas leaves separator 21 by line 22 and is passed through heat exchanger 19 and thence by line 23 through heat exchanger 16. The purified hydrogen leaves heat exchanger 16 at 81° K. and is then passed by line 24 to expansion turbine 25 where it is expanded with the performance of external work to 14.5 kg./cm.² and thereby cooled to 64° K. The purified, cold hydrogen leaving the turbine 25 by line 26 is then passed successively through heat exchanger 19, line 27, heat exchanger 16, line 28 and heat exchanger 12 respectively, becoming heated to ambient temperature in the process. The purified hydrogen product leaves the heat exchanger 12 by line 29 and is then passed to the point of use or storage. Depending on the refrigeration requirements, a minor part of the purified hydrogen stream may by-pass the turbine, being taken off line 23 to pass via line 30 and expansion valve 31 to rejoin the main stream in line 26.

The condensate from separator 14 is expanded through valve 32 to about 2 kg./cm.² and is then passed by line 33 through heat exchanger 12 and evaporated by indirect heat exchange with the incoming purge gas and forms a high pressure tail gas.

The nitrogen rich condensates from separators 21 and 17 are expanded through valves 34 and 35 respectively to about 1.3 kg./cm.² absolute and passed by lines 36 and 37 respectively to line 38 where they are combined. Some hydrogen taken off from the line 28 and expanded through valve 39 is passed by line 40 to join the condensate stream in line 38 and this stream is then evaporated in passing downwardly through heat exchanger 16. The addition of a small amount of hydrogen reduces the temperature range over which the condensate evaporates in passing through heat exchanger 16. The evaporated condensate is then passed by line 41 to heat exchanger 12, in passing through which it becomes heated to ambient temperature. Part of the condensate from 17 may be passed direct to line 41. This tail gas, after adjustment of the pressure, may be combined with the high pressure tail gas referred to above.

The hydrogen concentrate product may be obtained with a hydrogen content of 98% by volume.

We claim:

1. A process for the recovery of a hydrogen concentrate from an ammonia synthesis purge gas at a superatmospheric pressure containing hydrogen as it main component and containing nitrogen, argon and methane, which gas has been freed from moisture and traces of ammonia, the process comprising cooling the purge gas in a plurality of heat exchangers to condense out components other than hydrogen with said condensed components being separated after passage through at least the final two heat exchangers and producing refrigeration for use in the process by expansion with the performace of work of the hydrogen concentrate, the incoming purge gas being cooled by indirect heat exchange with returning gas streams and evaporating condensates, characterised in that in the next to last heat exchanger partially concentrated hydrogen from a preceding heat exchanger is passed upwardly with condensate formed therein flowing downwards in contact with the rising stream and is cooled to a temperature such that substantially all the argon and methane and part of the nitrogen contained therein are removed as condensate and that the thus further concentrated hydrogen is passed downwardly through the final heat exchanger to condense and thus remove an additional quantity of nitrogen, the cooling streams in the final heat exchanger, which are passed upwardly therethrough, comprising the finally concentrated hydrogen after separation of the condensate therefrom, and at least part of the finally concentrated hydrogen after it has passed first through the final heat exchanger and then through the next to last heat exchanger and then been expanded with the performance of external work to cool it to a lower temperature and the cooling streams in the next to the last heat exchanger, which pass downwardly therethrough, comprising the said at least part of the finally concentrated hydrogen before it is expanded, the expanded finally concentrated hydrogen after it has passed through the final heat exchanger and at least part of the condensates collected at the lower ends of the next to last and last heat exchanger after expansion thereof to a lower pressure and the introduction thereinto of sufficient of the finally concentrated hydrogen product expanded to the same lower pressure to reduce the evaporation temperature of the condensates to the required degree.

2. A process according to claim 1, wherein the whole of the condensate collected at the lower end of the final heat exchanger is combined with at least part of the condensate collected at the lower end of the next to last heat exchanger and hydrogen concentrate introduced thereinto to form the evaporating cooling stream passing downwardly through the next to last heat exchanger.

3. A process as claimed in claim 1, in which after the finally concentrated hydrogen has passed upwardly through the final heat exchanger as a cooling stream, a part thereof is separated and after expansion through an expansion valve to the same pressure as that to which part of the finally concentrated hydrogen is expanded with performance of external work, is recombined with the expanded last mentioned part of finally concentrated hydrogen prior to its passage through the final heat exchanger.

4. A process according to claim 3 wherein the whole of the condensate collected at the lower end of the final heat exchanger is combined with at least part of the condensate collected at the lower end of the next to last heat exchanger and hydrogen concentrate introduced thereinto to form the evaporating cooling stream passing downwardly through the next to last heat exchanger.

References Cited

UNITED STATES PATENTS

| | | | |
|---|---|---|---|
| 2,591,658 | 4/1952 | Haringhuizen | 62—23 |
| 3,026,682 | 3/1962 | Palazzo | 62—23 XR |
| 3,062,015 | 11/1962 | Cost | 62—23 XR |
| 3,097,940 | 7/1963 | Houston | 62—23 XR |
| 3,359,744 | 12/1967 | Bolez | 62—23 XR |
| 3,363,428 | 1/1968 | Charlesworth | 62—23 |

NORMAN YUDKOFF, *Primary Examiner.*

V. W. PRETKA, *Assistant Examiner.*

U.S. Cl. X.R.

62—39; 200—31, 38